(12) United States Patent
Okutani et al.

(10) Patent No.: US 12,092,205 B2
(45) Date of Patent: Sep. 17, 2024

(54) CONTINUOUSLY VARIABLE TRANSMISSION, METHOD FOR CONTROLLING CONTINUOUSLY VARIABLE TRANSMISSION, AND NON-TRANSITORY COMPUTER-READABLE MEDIUM

(71) Applicants: JATCO Ltd, Fuji (JP); NISSAN MOTOR CO., LTD., Yokohama (JP)

(72) Inventors: Shou Okutani, Isehara (JP); Masahiro Kusuda, Atsugi (JP); Tomohiro Utagawa, Sagamihara (JP); Hironori Miyaishi, Sagamihara (JP); Seiichirou Takahashi, Isehara (JP); Yusuke Nakano, Yamato (JP); Hiromu Soya, Hiratsuka (JP); Jumpei Hayakawa, Isehara (JP); Makoto Oguri, Ayase (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/264,306

(22) PCT Filed: Feb. 7, 2022

(86) PCT No.: PCT/JP2022/004669
§ 371 (c)(1),
(2) Date: Aug. 4, 2023

(87) PCT Pub. No.: WO2022/176673
PCT Pub. Date: Aug. 25, 2022

(65) Prior Publication Data
US 2024/0102552 A1 Mar. 28, 2024

(30) Foreign Application Priority Data
Feb. 18, 2021 (JP) ................. 2021-023987

(51) Int. Cl.
*F16H 59/42* (2006.01)
*F16H 59/46* (2006.01)
(Continued)

(52) U.S. Cl.
CPC ............. *F16H 59/46* (2013.01); *F16H 59/42* (2013.01); *F16H 61/662* (2013.01);
(Continued)

(58) Field of Classification Search
CPC ............... F16H 59/46; F16H 2059/683; F16H 2059/704; F16H 59/42; F16H 61/662; F16H 61/66231; F16H 2061/66277
(Continued)

(56) References Cited

U.S. PATENT DOCUMENTS

| 11,738,752 B2 * | 8/2023 | Miyaishi | ................. F02D 29/00 477/46 |
| 2010/0210414 A1 * | 8/2010 | Tanaka | .................. B60W 10/06 477/107 |

FOREIGN PATENT DOCUMENTS

JP   H10-103437 A   4/1998

* cited by examiner

*Primary Examiner* — Roger L Pang
(74) *Attorney, Agent, or Firm* — Foley & Lardner LLP (57) ABSTRACT

A continuously variable transmission includes: a first pulley and a second pulley each including a fixed pulley and a movable pulley; and an endless member wound around the first pulley and the second pulley, wherein the continuously variable transmission continuously changes a speed ratio by controlling a thrust of the movable pulley with a hydraulic pressure, the thrust of the movable pulley is made smaller as a rotation speed of the first pulley decreases, and when the rotation speed of the first pulley is lower than a predetermined rotation speed, the thrust of the movable pulley in a case where the speed ratio is on a Low side of the predetermined speed ratio is not made smaller than the thrust of (Continued)

the movable pulley in a case where the speed ratio is on a High side of the predetermined speed ratio.

4 Claims, 5 Drawing Sheets

(51) Int. Cl.
*F16H 61/662* (2006.01)
*F16H 59/68* (2006.01)
*F16H 59/70* (2006.01)

(52) U.S. Cl.
CPC .. *F16H 2059/683* (2013.01); *F16H 2059/704* (2013.01); *F16H 2061/66277* (2013.01)

(58) Field of Classification Search
USPC .............................. 701/51, 60, 61; 477/45, 46
See application file for complete search history.

CONTINUOUSLY VARIABLE TRANSMISSION, METHOD FOR CONTROLLING CONTINUOUSLY VARIABLE TRANSMISSION, AND NON-TRANSITORY COMPUTER-READABLE MEDIUM

TECHNICAL FIELD

The present invention relates to a continuously variable transmission, a method for controlling a continuously variable transmission, and a program.

BACKGROUND ART

Patent Document 1 discloses a method for controlling a pulley thrust of a V-belt continuously variable transmission in which a speed ratio is continuously variable by controlling V-shaped groove intervals in an input pulley and an output pulley and a thrust of a movable pulley of both the pulleys with a hydraulic pressure or the like, in which the thrust of the movable pulley, which is determined according to an engine torque and the speed ratio, is corrected such that the thrust of the movable pulley is made lager as a rotation speed of the input pulley increases.

Accordingly, slip of a belt can be effectively prevented even under an operating condition in which the rotation speed of the input pulley is relatively high.

PRIOR ART DOCUMENT

Patent Document

Patent Document 1: JP H 10-103437 A

SUMMARY OF INVENTION

However, the above-described technique focuses on preventing the slip of the belt (an endless member) during high-speed rotation, and does not consider an influence of the slip of the belt caused by a difference in the speed ratio.

The present invention has been made in view of such a technical problem, and an object of the present invention is to prevent slip of an endless member and improve fuel efficiency.

According to one aspect of the present invention, a continuously variable transmission includes: a first pulley and a second pulley each including a fixed pulley and a movable pulley; and an endless member wound around the first pulley and the second pulley, wherein the continuously variable transmission continuously changes a speed ratio by controlling a thrust of the movable pulley with a hydraulic pressure, the thrust of the movable pulley is made smaller as a rotation speed of the first pulley decreases, and when the rotation speed of the first pulley is lower than a predetermined rotation speed, the thrust of the movable pulley in a case where the speed ratio is on a Low side of the predetermined speed ratio is not made smaller than the thrust of the movable pulley in a case where the speed ratio is on a High side of the predetermined speed ratio.

In the above aspect, the thrust of the movable pulley is made smaller as the rotation speed of the first pulley decreases. Therefore, since frictional resistance between the endless member and each of the first pulley and the second pulley can be reduced, slip of a belt during high-speed rotation can be prevented and fuel efficiency can be improved. When the rotation speed of the first pulley is lower than the predetermined rotation speed, the thrust of the movable pulley in the case where the speed ratio is on the Low side of the predetermined speed ratio is not made smaller than the thrust of the movable pulley in a case where the speed ratio is on the High side of the predetermined speed ratio. Therefore, in a state where a speed ratio in which an input torque to the first pulley is often made larger is on the Low side of the predetermined speed ratio, the thrust of the movable pulley is not made smaller than necessary even when the rotation speed of the first pulley decreases, and thus the slip of the endless member can be prevented. Therefore, according to these aspects, the slip of the endless member caused by a difference in a speed ratio can be prevented and fuel efficiency can be improved.

DESCRIPTION OF EMBODIMENTS

An embodiment of the present invention will be described below with reference to the accompanying drawings. Hereinafter, a case where a speed ratio Rv is large (=a case where a reduction ratio is large) is referred to as Low, a case where the speed ratio Rv is small (=a case where the reduction ratio is small) (when the speed ratio (the reduction ratio) is smaller than 1, the speed is increased) is referred to as High. Shifting the speed ratio Rv to a Low side is referred to as a downshift, and shifting the speed ratio Rv to a High side is referred to as an upshift.

Figure 1:
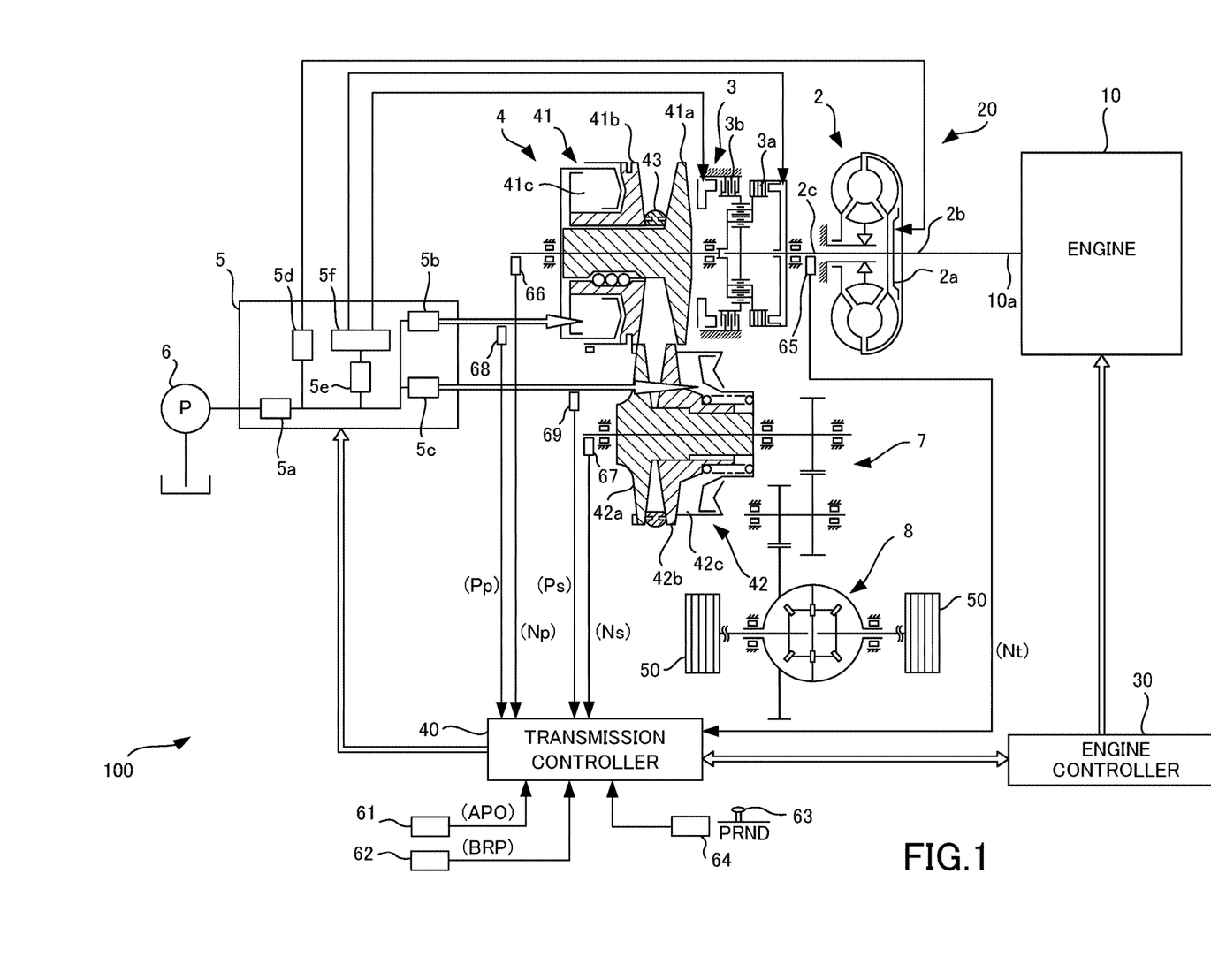
FIG. 1 is a schematic configuration diagram of a vehicle including an automatic transmission according to an embodiment of the present invention.

FIG. 1 is a schematic configuration diagram of a vehicle 100 including an automatic transmission 20 as a continuously variable transmission according to an embodiment of the present invention. As shown in FIG. 1, the vehicle 100 includes an engine 10 as a drive source, the automatic transmission 20, and an engine controller 30.

The automatic transmission 20 includes a torque converter 2, a forward/reverse switching mechanism 3, a variator 4, a hydraulic control circuit 5, an oil pump 6, and a transmission controller 40.

In the vehicle 100, rotation generated in the engine 10 is transmitted to driving wheels 50 via the torque converter 2, the forward/reverse switching mechanism 3, the variator 4, a gear set 7, and a differential gear device 8.

The torque converter 2 is provided with a lock-up clutch 2a. When the lock-up clutch 2a is engaged, an input shaft 2b and an output shaft 2c of the torque converter 2 are directly connected to each other, and the input shaft 2b and the output shaft 2c rotate at the same speed. Therefore, in a state where the lock-up clutch 2a is engaged, rotation of an output shaft 10a of the engine 10 is directly transmitted via the output shaft 2c of the torque converter 2 to the forward/reverse switching mechanism 3.

The forward/reverse switching mechanism 3 includes a double pinion planetary gear set as a main component, a sun gear of the double pinion planetary gear set is coupled to the engine 10 via the torque converter 2, and a carrier of the double pinion planetary gear set is coupled to a primary pulley 41 serving as a first pulley of the variator 4. The forward/reverse switching mechanism 3 further includes a forward clutch 3a that directly connects the sun gear and the carrier of the double pinion planetary gear set, and a reverse brake 3b that fixes a ring gear. When the forward clutch 3a is engaged, input rotation from the engine 10 via the torque converter 2 is directly transmitted to the primary pulley 41, and when the reverse brake 3b is engaged, the input rotation from the engine 10 via the torque converter 2 is reversely decelerated and transmitted to the primary pulley 41.

The variator 4 is a continuously variable transmission mechanism that shifts the rotation of the engine 10 transmitted to the primary pulley 41 and transmits the shifted rotation from a secondary pulley 42 serving as a second pulley to the driving wheels 50.

The variator 4 includes the primary pulley 41 and the secondary pulley 42 that are arranged such that V-shaped grooves are aligned, and a belt 43 as an endless member that is wound around the V-shaped grooves of the pulleys 41 and 42.

In the variator 4, in order to make it possible to change the speed ratio Rv between the primary pulley 41 and the secondary pulley 42 during the power transmission, among conical plates forming the V-shaped grooves of the primary pulley 41 and the secondary pulley 42, some conical plates are referred to as fixed pulleys 41a and 42a, and the other conical plates are referred to as movable pulleys 41b and 42b that can be displaced in an axial direction.

These movable pulleys 41b and 42b are biased toward the fixed pulleys 41a and 42a by supplying a primary pulley pressure Pp and a secondary pulley pressure Ps to a primary pulley chamber 41c and a secondary pulley chamber 42c, whereby the belt 43 is frictionally engaged with the conical plates to perform power transmission between the primary pulley 41 and the secondary pulley 42.

At the time of shift, a width of the V-shaped grooves of both the pulleys 41 and 42 is changed by a differential pressure between the primary pulley pressure Pp and the secondary pulley pressure Ps generated corresponding to a target speed ratio TRv, and a winding arc diameter of the belt 43 with respect to the pulleys 41 and 42 is continuously changed, thereby realizing the target speed ratio TRv.

The oil pump 6 is a mechanical oil pump that receives the rotation of the engine 10 and is driven using part of the power of the engine 10. Oil discharged from the oil pump 6 is supplied to the hydraulic control circuit 5.

The hydraulic control circuit 5 includes: a regulator valve 5a that regulates a pressure of hydraulic oil supplied from the oil pump 6 to generate a required hydraulic pressure; a primary solenoid valve 5b that adjusts a hydraulic pressure supplied to the primary pulley chamber 41c of the primary pulley 41; a secondary solenoid valve 5c that adjusts a hydraulic pressure supplied to the secondary pulley chamber 42c of the secondary pulley 42; a lock-up solenoid valve 5d that adjusts a hydraulic pressure supplied to the lock-up clutch 2a; a select solenoid valve 5e that adjusts a hydraulic pressure supplied to the forward clutch 3a and a hydraulic pressure supplied to the reverse brake 3b; and a manual valve 5f that switches a supply path of the hydraulic pressure to the forward clutch 3a and the reverse brake 3b.

The hydraulic control circuit 5 supplies the adjusted hydraulic pressure to each of the torque converter 2, the forward/reverse switching mechanism 3, and the variator 4 based on a control signal from the transmission controller 40.

The engine controller 30 includes a microcomputer including a CPU, a RAM, a ROM, an input and output interface, and the like. The engine controller 30 performs various processes by reading and executing programs stored in the ROM by the CPU. The engine controller 30 may also include a plurality of microcomputers.

The engine controller 30 controls a rotation speed, a torque Te (hereinafter referred to as an engine torque Te), and the like of the engine 10 based on signals from various sensors each detecting a state of a part of the vehicle 100.

The transmission controller 40 includes a microcomputer including a CPU, a RAM, a ROM, an input and output interface, and the like, and is communicably connected to the engine controller 30. The transmission controller 40 performs various processes by reading and executing programs stored in the ROM by the CPU. The transmission controller 40 may also include a plurality of microcomputers. The transmission controller 40 and the engine controller 30 may be integrated into one controller.

The transmission controller 40 controls an engaged state of the lock-up clutch 2a, the speed ratio Rv of the variator 4, engaged states of the forward clutch 3a and the reverse brake 3b, and the like based on the signals from various sensors each detecting a state of a part of the vehicle 100.

The transmission controller 40 receives a signal from an accelerator opening sensor 61 that detects an accelerator opening APO, a signal from a brake hydraulic pressure sensor 62 that detects a brake hydraulic pressure BRP corresponding to an operation amount of a brake pedal, a signal from an inhibitor switch 64 that detects a position of a shifter 63, a signal from a turbine rotation speed sensor 65 that detects a rotation speed Nt of the output shaft 2c of the torque converter 2, a signal from a primary rotation speed sensor 66 that detects a rotation speed Np of the primary pulley 41 (hereinafter referred to as a primary rotation speed Np), a signal from a secondary rotation speed sensor 67 that detects a rotation speed Ns of the secondary pulley 42 (hereinafter referred to as a secondary rotation speed Ns), a signal from a primary hydraulic pressure sensor 68 that detects the primary pulley pressure Pp, a signal from a secondary hydraulic pressure sensor 69 that detects the secondary pulley pressure Ps, and the like.

As described above, in the variator 4, the movable pulleys 41b and 42b are biased toward the fixed pulleys 41a and 42a by the primary pulley pressure Pp and the secondary pulley pressure Ps (a force for biasing the movable pulleys 41b and 42b toward the fixed pulleys 41a and 42a by the primary pulley pressure Pp and the secondary pulley pressure Ps is referred to as "thrust"), whereby the belt 43 is frictionally engaged with the conical plates to perform power transmission between the primary pulley 41 and the secondary pulley 42.

Therefore, in the variator 4, it is important to control a thrust F of the movable pulleys 41b and 42b (hereinafter referred to as a pulley thrust F) such that the belt 43 does not slip. On the other hand, when the pulley thrust F is made larger than necessary, frictional resistance between the belt 43 and each of the pulleys 41 and 42 increases, which may influence fuel efficiency of the vehicle 100.

Therefore, the transmission controller 40 according to the present embodiment controls the primary pulley pressure Pp and the secondary pulley pressure Ps that generate the pulley thrust F such that the slip of the belt 43 can be prevented and the fuel efficiency can be improved.

Hereinafter, the transmission controller 40 will be described in detail.

Figure 2:
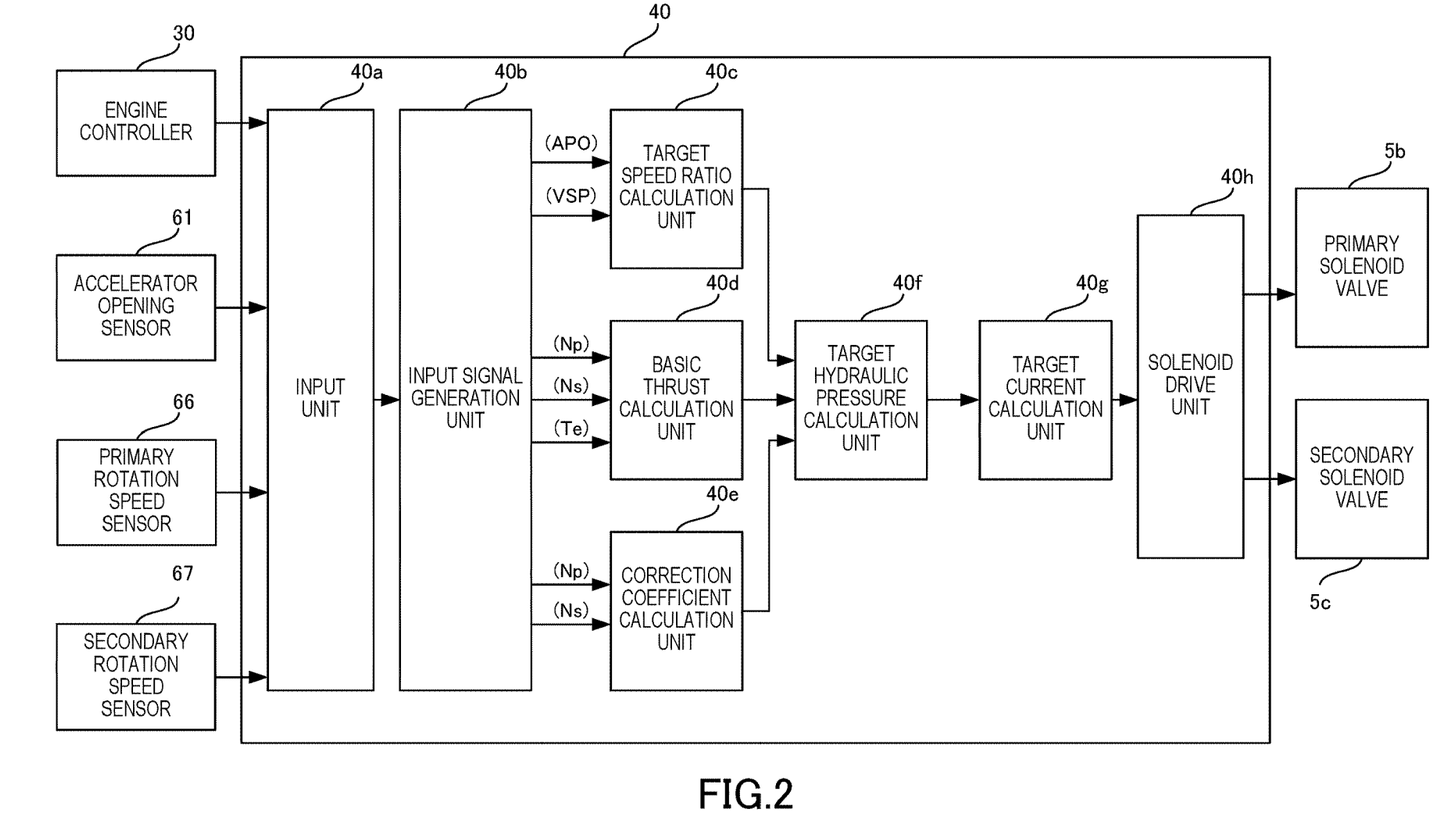
FIG. 2 is a schematic configuration diagram of a transmission controller.

FIG. 2 is a schematic configuration diagram of the transmission controller 40. FIG. 2 is a block diagram showing a part of functions of the transmission controller 40, and each block does not mean a physical configuration.

As shown in FIG. 2, the transmission controller 40 includes an input unit 40a, an input signal generation unit 40b, a target speed ratio calculation unit 40c, a basic thrust calculation unit 40d, a correction coefficient calculation unit 40e, a target hydraulic pressure calculation unit 40f, a target current calculation unit 40g, and a solenoid drive unit 40h.

The input unit 40a receives a signal from the engine controller 30, a signal from the accelerator opening sensor 61, a signal from the primary rotation speed sensor 66, a signal from the secondary rotation speed sensor 67, and the like.

The input signal generation unit 40b generates a signal indicating the engine torque Te based on the signal input from the engine controller 30 to the input unit 40a, generates a signal indicating the accelerator opening APO based on the signal input from the accelerator opening sensor 61 to the input unit 40a, generates a signal indicating the primary rotation speed Np based on the signal input from the primary rotation speed sensor 66 to the input unit 40a, and generates a signal indicating a vehicle speed VSP and a signal indicating the secondary rotation speed Ns based on the signal input from the secondary rotation speed sensor 67 to the input unit 40a.

The target speed ratio calculation unit 40c refers to a shift map set in advance based on various factors of the vehicle 100, experiments, and the like, and calculates the target speed ratio TRv of the variator 4 based on the accelerator opening APO and the vehicle speed VSP. Instead of the accelerator opening APO, a throttle valve opening TVO received from the engine controller 30 may be used.

The basic thrust calculation unit 40d refers to a basic thrust map set in advance based on various factors of the vehicle 100, experiments, and the like, and calculates a basic thrust Fb, which is a basis of a target pulley thrust TF, based on the engine torque Te and the speed ratio Rv. The speed ratio Rv is obtained based on the primary rotation speed Np and the secondary rotation speed Ns.

The basic thrust map is a map in which the engine torque Te and the speed ratio Rv are set as parameters, and the pulley thrust F that does not cause the belt 43 to slip when the primary rotation speed Np (=engine rotation speed) is a predetermined rotation speed Nps is set as the basic thrust Fb. The predetermined rotation speed Nps may be, for example, about 2500 rpm to 3500 rpm, which is the most frequently used rotation speed of the engine 10, or may be an intermediate rotation speed in a generally used rotation speed range.

The correction coefficient calculation unit 40e refers to a correction coefficient map set in advance based on various factors of the vehicle 100, experiments, and the like, and calculates a correction coefficient for correcting the basic thrust Fb based on the primary rotation speed Np and the speed ratio Rv. The correction coefficient map will be described in detail later.

The target hydraulic pressure calculation unit 40f multiplies the basic thrust Fb obtained by the basic thrust calculation unit 40d by the correction coefficient obtained by the correction coefficient calculation unit 40e to calculate the target pulley thrust TF. Then, a target primary pulley pressure TPp and a target secondary pulley pressure TPs for realizing the target pulley thrust TF and the target speed ratio TRv are calculated.

The target current calculation unit 40g calculates a primary solenoid instruction current Ip and a secondary solenoid instruction current Is for realizing the target primary pulley pressure TPp and the target secondary pulley pressure TPs obtained by the target hydraulic pressure calculation unit 40f.

The solenoid drive unit 40h supplies an instruction current to the primary solenoid valve 5b and the secondary solenoid valve 5c based on the primary solenoid instruction current Ip and the secondary solenoid instruction current Is obtained by the target current calculation unit 40g.

Figure 3:
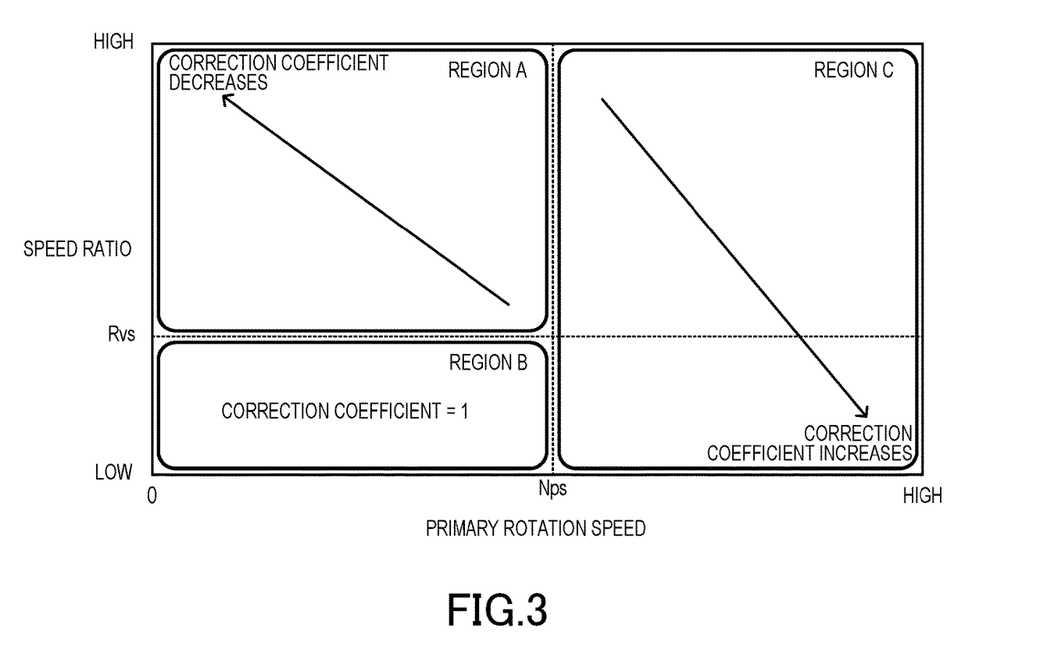
FIG. 3 is a diagram showing a correction coefficient map.
Figure 4:
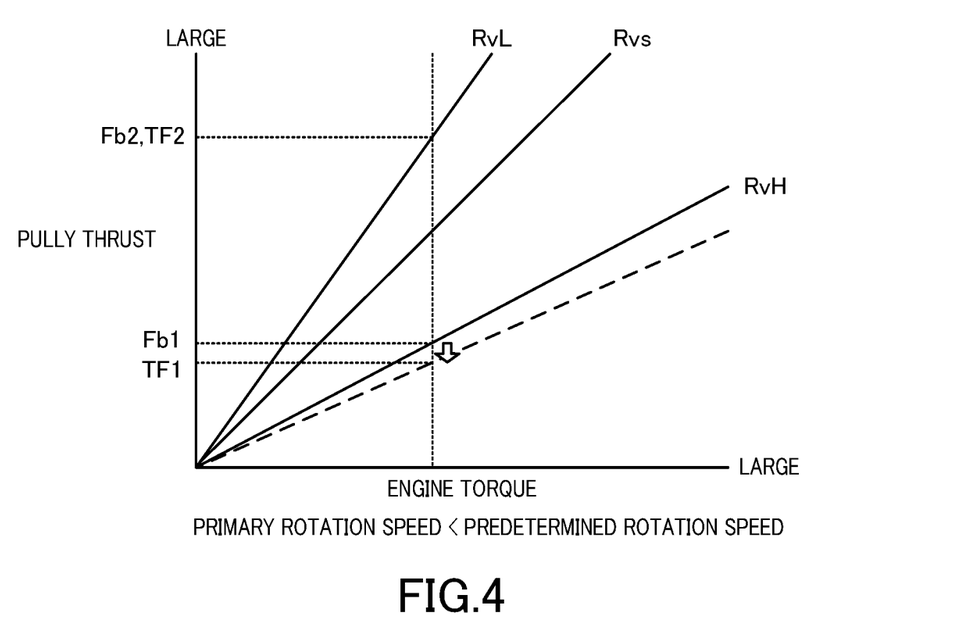
FIG. 4 is a diagram illustrating correction of a basic thrust when a primary rotation speed is lower than a predetermined rotation speed.
Figure 5:
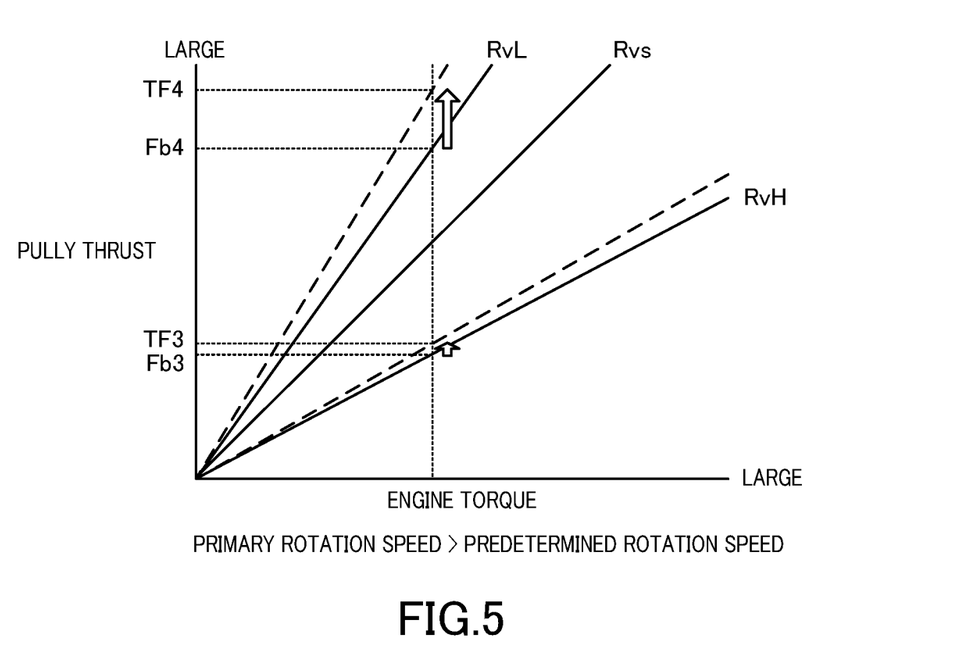
FIG. 5 is a diagram illustrating correction of a basic thrust when the primary rotation speed is higher than the predetermined rotation speed.

Next, correction of the basic thrust Fb will be described with reference to FIGS. 3 to 5. FIG. 3 is a diagram showing the correction coefficient map. FIG. 4 is a diagram illustrating the correction of the basic thrust Fb when the primary rotation speed Np is lower than the predetermined rotation speed Nps. FIG. 5 is a diagram illustrating the correction of the basic thrust Fb when the primary rotation speed Np is higher than the predetermined rotation speed Nps.

As shown in FIG. 3, the correction coefficient map includes a region A in which the primary rotation speed Np is lower than the predetermined rotation speed Nps and the speed ratio Rv is on a High side of the predetermined speed ratio Rvs, a region B in which the primary rotation speed Np is lower than the predetermined rotation speed Nps and the speed ratio Rv is on a Low side of the predetermined speed ratio Rvs, and a region C in which the primary rotation speed Np is higher than the predetermined rotation speed Nps.

As described above, the basic thrust map is a map in which the pulley thrust F when the primary rotation speed Np is the predetermined rotation speed Nps is set. Therefore, when the primary rotation speed Np is the predetermined rotation speed Nps, it is not necessary to correct the basic thrust Fb, and the correction coefficient is set to "1".

Therefore, when the primary rotation speed Np is the predetermined rotation speed Nps, the basic thrust Fb is multiplied by "1", and the basic thrust Fb is directly the target pulley thrust TF.

In the region A, the correction coefficient is made smaller as the primary rotation speed Np decreases and as the speed ratio Rv shifts to the High side, as indicated by an arrow, with the correction coefficient "1" as the reference. That is, in the region A, the correction coefficient is a value smaller than "1".

Therefore, when the primary rotation speed Np is lower than the predetermined rotation speed Nps and the speed ratio Rv is on the High side of the predetermined speed ratio Rvs, the basic thrust Fb is multiplied by a smaller correction coefficient and the target pulley thrust TF is made smaller as the primary rotation speed Np decreases and as the speed ratio Rv shifts to the High side.

For example, in FIG. 4, when the primary rotation speed Np is lower than the predetermined rotation speed Nps and the speed ratio Rv is a speed ratio RvH on the High side of the predetermined speed ratio Rvs, the basic thrust Fb is a basic thrust Fb1.

Here, since the primary rotation speed Np is lower than the predetermined rotation speed Nps and the speed ratio Rv is on the High side of the predetermined speed ratio Rvs, the basic thrust Fb1 is corrected using the correction coefficient in the region A in the correction coefficient map. As a result, as indicated by an arrow, a target pulley thrust TF1 having a value smaller than the basic thrust Fb1 is obtained.

As the primary rotation speed Np decreases, a centrifugal force applied to the belt 43 decreases, and thus the belt 43 is less likely to slip. In addition, as the speed ratio Rv shifts to the High side, an input torque to the primary pulley 41 is less likely to increase.

Therefore, in the region A, the slip of the belt 43 can be prevented even when the pulley thrust F is made smaller than that in the case where the primary rotation speed Np is the predetermined rotation speed Nps. By reducing the pulley thrust F, the frictional resistance between the belt 43 and each of the pulleys 41 and 42 is also reduced. Therefore, the fuel efficiency of the vehicle 100 can be improved.

In the region B, the correction coefficient is set to "1". That is, even when the primary rotation speed Np is lower than the predetermined rotation speed Nps, the target pulley thrust TF is not made smaller than that in the case where the speed ratio Rv is on the High side of the predetermined speed ratio Rvs.

Therefore, when the primary rotation speed Np is lower than the predetermined rotation speed Nps and the speed ratio Rv is on the Low side of the predetermined speed ratio Rvs, the basic thrust Fb is multiplied by "1", and the basic thrust Fb is directly the target pulley thrust TF.

For example, in FIG. 4, when the primary rotation speed Np is lower than the predetermined rotation speed Nps and the speed ratio Rv is a speed ratio RvL on the Low side of the predetermined speed ratio Rvs, the basic thrust Fb is a basic thrust Fb2.

Here, since the primary rotation speed Np is lower than the predetermined rotation speed Nps and the speed ratio Rv is on the Low side of the predetermined speed ratio Rvs, the basic thrust Fb2 is corrected using the correction coefficient "1" in the region B in the correction coefficient map. As a result, a target pulley thrust TF2 having the same value as the basic thrust Fb2 is obtained.

In other words, the pulley thrust F does not change depending on the primary rotation speed Np when the primary rotation speed Np is lower than the predetermined rotation speed Nps and the speed ratio Rv is on the Low side of the predetermined speed ratio Rvs.

The input torque to the primary pulley 41 is often made larger as the speed ratio Rv shifts to the Low side. Therefore, in the region B, even when the primary rotation speed Np is lower than the predetermined rotation speed Nps, the slip of the belt 43 is prevented by not making the pulley thrust F smaller than that in the case where the speed ratio Rv is on the High side of the predetermined speed ratio Rvs.

That is, the predetermined speed ratio Rvs is a threshold at which the input torque to the primary pulley 41 is often made larger when the speed ratio Rv is on the Low side of the predetermined speed ratio Rvs, and it is considered preferable to give priority to preventing the slip of the belt 43. The predetermined speed ratio Rvs is set in advance based on various factors of the vehicle 100, experiments, and the like.

As described above, as the primary rotation speed Np decreases, the centrifugal force applied to the belt 43 decreases. Therefore, it is also possible to set the correction coefficient in the region B within a range in which the pulley thrust F can be made smaller in response to the decrease in the centrifugal force. In this case, the correction coefficient in the region B is a value between "a maximum value of the correction coefficient in the region A" and "1".

In the region C, the correction coefficient is made larger as the primary rotation speed Np increases and as the speed ratio Rv shifts to the Low side, as indicated by an arrow, with the correction coefficient "1" as the reference. That is, in the region C, the correction coefficient is a value larger than "1".

Therefore, when the primary rotation speed Np is higher than the predetermined rotation speed Nps, the basic thrust Fb is multiplied by a larger correction coefficient and the target pulley thrust TF is made larger as the primary rotation speed Np increases and as the speed ratio Rv shifts to the Low side.

For example, in FIG. 5, when the primary rotation speed Np is higher than the predetermined rotation speed Nps and the speed ratio Rv is the speed ratio RvH on the High side of the predetermined speed ratio Rvs, the basic thrust Fb is a basic thrust Fb3.

Here, since the primary rotation speed Np is higher than the predetermined rotation speed Nps, the basic thrust Fb3 is corrected using the correction coefficient in the region C in the correction coefficient map. As a result, as indicated by an arrow, a target pulley thrust TF3 having a value larger than the basic thrust Fb3 is obtained.

For example, in FIG. 5, when the primary rotation speed Np is higher than the predetermined rotation speed Nps and the speed ratio Rv is the speed ratio RvL on the Low side of the predetermined speed ratio Rvs, the basic thrust Fb is a basic thrust Fb4.

Here, since the primary rotation speed Np is higher than the predetermined rotation speed Nps, the basic thrust Fb4 is corrected using the correction coefficient in the region C in the correction coefficient map. As a result, as indicated by an arrow, a target pulley thrust TF4 having a value larger than the basic thrust Fb4 is obtained. In the case of the speed ratio RvL, the correction coefficient is larger than that in the case of the speed ratio RvH, and thus a correction ratio for the basic thrust Fb4 is larger than a correction ratio for the basic thrust Fb3.

As the primary rotation speed Np increases, the centrifugal force applied to the belt 43 increases, and thus the belt 43 is likely to slip. In addition, as the speed ratio Rv shifts to the Low side, the input torque to the primary pulley 41 is often made larger.

On the other hand, in the region C, the basic thrust Fb is corrected to be larger and the target pulley thrust TF is made larger as the primary rotation speed Np increases and as the speed ratio Rv shifts to the Low side. As a result, since the pulley thrust F is made larger, the slip of the belt 43 can be prevented.

In this way, the transmission controller 40 obtains the basic thrust Fb based on the engine torque Te and the speed ratio Rv, and corrects the basic thrust Fb using the correction coefficient obtained based on the primary rotation speed Np and the speed ratio Rv to obtain the target pulley thrust TF.

Accordingly, when the engine torque Te and the speed ratio Rv are considered to be constant, the pulley thrust F is made smaller as the primary rotation speed Np decreases. Therefore, the fuel efficiency of the vehicle 100 can be improved.

However, in the case where the speed ratio Rv is on the Low side of the predetermined speed ratio Rvs, even when the primary rotation speed Np is lower than the predetermined rotation speed Nps, the transmission controller 40 does not make the pulley thrust F smaller than that in the case where the speed ratio Rv is on the High side of the predetermined speed ratio Rvs. Accordingly, the slip of the belt 43 in the case where the speed ratio Rv is on the Low side of the predetermined speed ratio Rvs is prevented.

Figure 6:
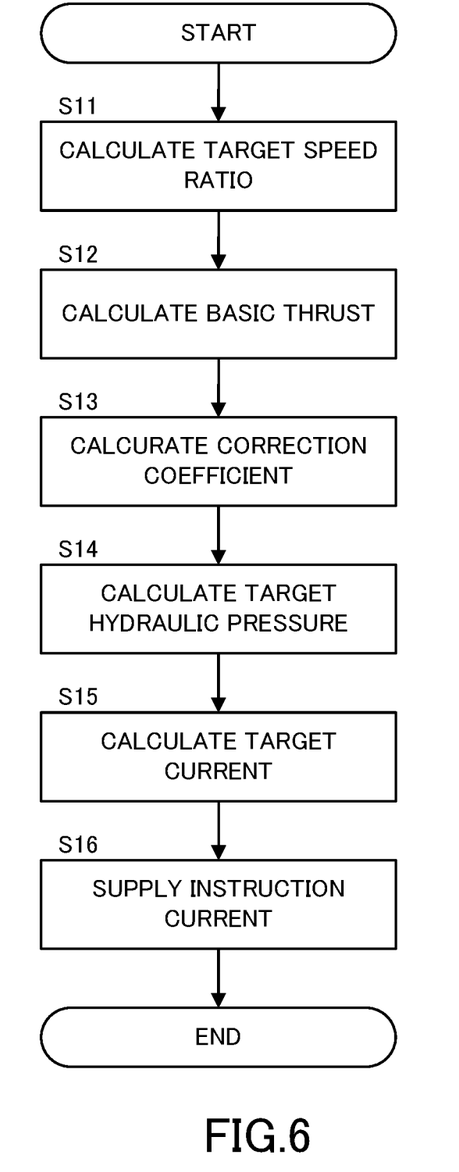
FIG. 6 is a flowchart showing a process performed by the transmission controller.

Next, a process executed by the transmission controller 40 will be described with reference to FIG. 6. FIG. 6 is a flowchart showing the process performed by the transmission controller 40.

In step S11, the transmission controller 40 refers to a shift map set in advance based on various factors of the vehicle 100, experiments, and the like, and calculates the target speed ratio TRv of the variator 4 based on the accelerator opening APO and the vehicle speed VSP.

In step S12, the transmission controller 40 refers to a basic thrust map set in advance based on various factors of the vehicle 100, experiments, and the like, and calculates the basic thrust Fb, which is a basis of the target pulley thrust TF, based on the engine torque Te and the speed ratio Rv.

In step S13, the transmission controller 40 refers to a correction coefficient map set in advance based on various factors of the vehicle 100, experiments, and the like, and calculates a correction coefficient for correcting the basic thrust Fb based on the primary rotation speed Np and the speed ratio Rv.

In step S14, the transmission controller 40 multiplies the basic thrust Fb by the correction coefficient to calculate the target pulley thrust TF. Then, the target primary pulley pressure TPp and the target secondary pulley pressure TPs for realizing the target pulley thrust TF and the target speed ratio TRv are calculated.

In step S15, the transmission controller 40 calculates the primary solenoid instruction current Ip and the secondary solenoid instruction current Is for realizing the target primary pulley pressure TPp and the target secondary pulley pressure TPs.

In step S16, the transmission controller 40 supplies an instruction current to the primary solenoid valve 5*b* and the secondary solenoid valve 5*c*.

Main functions and effects of the automatic transmission 20 configured as described above will be collectively described.

(1)(3)(4) In the automatic transmission 20 that includes the primary pulley 41 and the secondary pulley 42 each including the fixed pulleys 41*a* and 42*a* and the movable pulleys 41*b* and 42*b*, and the belt 43 wound around the primary pulley 41 and the secondary pulley 42, and that continuously changes the speed ratio Rv by controlling the thrust F of the movable pulleys 41*b* and 42*b* with the hydraulic pressure, the thrust F of the movable pulleys 41*b* and 42*b* is made smaller as the rotation speed Np of the primary pulley 41 decreases, and when the rotation speed Np of the primary pulley 41 is lower than the predetermined rotation speed Nps, the thrust F of the movable pulleys 41*b* and 42*b* in the case where the speed ratio Rv is on the Low side of the predetermined speed ratio Rvs is not made smaller than that in the case where the speed ratio Rv is on the High side of the predetermined speed ratio Rvs.

Accordingly, the thrust F of the movable pulleys 41*b* and 42*b* is made smaller as the rotation speed Np of the primary pulley 41 decreases. Therefore, the frictional resistance between the belt 43 and each of the primary pulley 41 and the secondary pulley 42 can be reduced, and the fuel efficiency can be improved. When the rotation speed Np of the primary pulley 41 is lower than the predetermined rotation speed Nps, the thrust F of the movable pulleys 41*b* and 42*b* in the case where the speed ratio Rv is on the Low side of the predetermined speed ratio Rvs is not made smaller than in the case where the speed ratio Rv is on the High side of the predetermined speed ratio Rvs. Therefore, in a state where the speed ratio Rv in which the input torque to the primary pulley 41 is often made larger is on the Low side of the predetermined speed ratio Rvs, the thrust F of the movable pulleys 41*b* and 42*b* is not smaller than necessary even when the rotation speed Np of the primary pulley 41 decreases, and thus the slip of the belt 43 can be prevented. Therefore, the slip of the belt 43 can be prevented and the fuel efficiency can be improved.

(2) The thrust F of the movable pulleys 41*b* and 42*b* does not change depending on the rotation speed Np of the primary pulley 41 when the rotation speed Np of the primary pulley 41 is lower than the predetermined rotation speed Nps and the speed ratio Rv is on the Low side of the predetermined speed ratio Rvs.

Accordingly, when the rotation speed Np of the primary pulley 41 is lower than the predetermined rotation speed Nps and the speed ratio Rv is on the Low side of the predetermined speed ratio Rvs, the thrust F of the movable pulleys 41*b* and 42*b* does not change even when the primary rotation speed Np changes. Therefore, even when the rotation speed Np of the primary pulley 41 decreases, the thrust F of the movable pulleys 41*b* and 42*b* is not made smaller, and thus the slip of the belt 43 can be prevented.

While an embodiment of the invention has been described, the embodiment is merely one of application examples of the invention, and does not intend to limit a technical scope of the invention to a specific configuration according to the embodiment.

For example, in the above embodiment, the primary rotation speed Np is used for setting of various maps and calculation. However, the settings of the various maps and calculations may be performed using the secondary rotation speed Ns.

Various programs executed by the transmission controller 40 may be stored in a non-transitory recording medium such as a CD-ROM.

DESCRIPTION OF REFERENCE SIGNS

20 automatic transmission (continuously variable transmission)
40 transmission controller (computer)
41 primary pulley (first pulley)
41*a* fixed pulley
41*b* movable pulley
42 secondary pulley (second pulley)
42*a* fixed pulley
42*b* movable pulley
43 belt (endless member)

The present application claims a priority of Japanese Patent Application No. 2021-023987 filed with the Japan Patent Office on Feb. 18, 2021, all the contents of which are hereby incorporated by reference.

The invention claimed is:
1. A continuously variable transmission comprising:
a first pulley and a second pulley each including a fixed pulley and a movable pulley; and
an endless member wound around the first pulley and the second pulley, wherein
the continuously variable transmission continuously changes a speed ratio by controlling a thrust of the movable pulleys with a hydraulic pressure,
the thrust of the movable pulleys is made smaller as a rotation speed of the first pulley decreases, and
when the rotation speed of the first pulley is lower than a predetermined rotation speed, the thrust of the movable pulleys in a case where the speed ratio is on a Low side of a predetermined speed ratio is not made smaller than the thrust of the movable pulleys in a case where the speed ratio is on a High side of the predetermined speed ratio.

2. The continuously variable transmission according to claim 1, wherein
the thrust of the movable pulleys does not change depending on the rotation speed of the first pulley when the rotation speed of the first pulley is lower than the predetermined rotation speed and the speed ratio is on the Low side of the predetermined speed ratio.

3. A method for controlling a continuously variable transmission that includes a first pulley and a second pulley each including a fixed pulley and a movable pulley, and an endless member wound around the first pulley and the second pulley, and that continuously changes a speed ratio by controlling a thrust of the movable pulleys with a hydraulic pressure, wherein
the method comprises:
making the thrust of the movable pulleys smaller as a rotation speed of the first pulley decreases; and
when the rotation speed of the first pulley is lower than a predetermined rotation speed, not making the thrust of the movable pulleys in a case where the speed ratio is on a Low side of a predetermined speed ratio smaller than the thrust of the movable pulleys in a case where the speed ratio is on a High side of the predetermined speed ratio.

4. A non-transitory computer-readable medium storing a computer-executable program for a continuously variable transmission that includes a first pulley and a second pulley each including a fixed pulley and a movable pulley, and an endless member wound around the first pulley and the second pulley, and that continuously changes a speed ratio by controlling a thrust of the movable pulleys with a hydraulic pressure, wherein
the program causes a computer to execute instructions for:
making the thrust of the movable pulleys smaller as a rotation speed of the first pulley decreases; and
when the rotation speed of the first pulley is lower than a predetermined rotation speed, not making the thrust of the movable pulleys in a case where the speed ratio is on a Low side of a predetermined speed ratio smaller than the thrust of the movable pulleys in a case where the speed ratio is on a High side of the predetermined speed ratio.

\* \* \* \* \*